US008843929B1

(12) United States Patent
Oppenheimer et al.

(10) Patent No.: US 8,843,929 B1
(45) Date of Patent: Sep. 23, 2014

(54) SCHEDULING IN COMPUTER CLUSTERS

(75) Inventors: David L. Oppenheimer, San Francisco, CA (US); Monika H. Henzinger, Attalens (DE); Robin A. Radez, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1556 days.

(21) Appl. No.: 12/173,697

(22) Filed: Jul. 15, 2008

(51) Int. Cl.
G06F 9/455 (2006.01)
G06F 9/46 (2006.01)

(52) U.S. Cl.
USPC .......................................... 718/102

(58) Field of Classification Search
None
See application file for complete search history.

(56) References Cited

U.S. PATENT DOCUMENTS 7,596,788 B1 * 9/2009 Shpigelman .................. 718/100
2005/0154860 A1 * 7/2005 Arimilli et al. ............... 712/216
2006/0080389 A1 * 4/2006 Powers et al. ................. 709/203

OTHER PUBLICATIONS

He et al.; Dynamic, Capability-driven Scheduling of DAG-based Real-time Jobs in Heterogeneous Clusters; 2003.*

* cited by examiner

*Primary Examiner* — Corey S Faherty
(74) *Attorney, Agent, or Firm* — Fish & Richardson P.C.

(57) ABSTRACT

A computer-implemented method for assigning computing tasks to computers in a group is disclosed. The method includes determining, for each computer in a group of computers, an ability of the computer to execute tasks expected to be received by the group of computers; generating an ability indicator for each computer based on the ability determination for the computer; and assigning an incoming computing task to one of the computers using the ability indicator.

17 Claims, 7 Drawing Sheets

| Machine | Feature 1 | Feature 2 | Status | Hotness | Task 1 | Task 2 | Task 3 | Task 4 | Task 5 |
|---|---|---|---|---|---|---|---|---|---|
| A | 2GB | v.2.0 | x | | x | x | | | |
| B | 2GB | v.2.0 | x | | x | x | | | |
| C | 2GB | v.2.0 | | | x | x | | | |
| D | 2GB | v.3.0 | | | x | x | | | |
| E | 2GB | v.3.0 | | | x | x | | | |
| F | 2GB | v.3.0 | | | x | x | | | |
| G | 2GB | v.3.0 | | | x | x | | | |
| H | 4GB | v.2.0 | x | | x | x | x | x | |
| I | 4GB | v.2.0 | x | | x | x | x | x | |
| J | 4GB | v.2.0 | | | x | x | x | x | |
| K | 4GB | v.2.0 | | | x | x | x | x | |
| L | 4GB | v.2.0 | | | x | x | x | x | |
| M | 4GB | v.3.0 | x | | x | x | x | x | x |
| N | 4GB | v.3.0 | | | x | x | x | x | x |
| . | . | | | | | | | | |
| . | . | | | | | | | | |
| . | . | | | | | | | | |
| . | . | | | | | | | | |
| x | . | | | | | | | | |

| Machine | Feature 1 | Feature 2 | Status | Hotness | Task 1 | Task 2 | Task 3 | Task 4 | Task 5 |
|---|---|---|---|---|---|---|---|---|---|
| A | 2GB | v.2.0 | x | | | x | | | |
| B | 2GB | v.2.0 | x | | x | x | | | |
| C | 2GB | v.2.0 | | | x | x | | | |
| D | 2GB | v.3.0 | | | x | x | | | |
| E | 2GB | v.3.0 | | | x | | | | |
| F | 2GB | v.3.0 | | | x | x | | | |
| G | 2GB | v.3.0 | | | x | x | | | |
| H | 4GB | v.2.0 | x | | x | x | x | x | |
| I | 4GB | v.2.0 | x | | x | x | x | x | |
| J | 4GB | v.2.0 | | | x | x | x | x | |
| K | 4GB | v.2.0 | | | x | x | x | x | |
| L | 4GB | v.2.0 | | | x | x | x | x | |
| M | 4GB | v.3.0 | x | | x | x | x | x | x |
| N | 4GB | v.3.0 | | | x | x | x | x | x |
| . | . | | | | | | | | |
| . | . | | | | | | | | |
| . | . | | | | | | | | |
| . | . | | | | | | | | |
| x | . | | | | | | | | |

FIG. 5

SCHEDULING IN COMPUTER CLUSTERS

TECHNICAL FIELD

This document relates to systems and techniques for assigning incoming tasks to computers in a cluster of computers (e.g., including tasks that are new to a system or tasks that are being rescheduled in the system, such as because a task was previously preempted by a higher-priority task or the task's machine failed).

BACKGROUND

Large-scale computing is used in a variety of areas. For example, scientific researchers often need numerous computers to crunch all of the numbers required for simulations of natural phenomena or for other matters. Companies and other organizations often need numerous computer servers to serve various employees seeking financial data or other information to do their jobs. And perhaps the fastest-growing example of large-scale computing is the commercial data center, which companies like GOOGLE and other companies use to fulfill a variety of requests from their customers, such as requests for streaming videos, storing and retrieving e-mail, performing searches across very large groups of documents, serving images, and the like. Such data centers may house thousands of computers.

Efficient assignment of computing tasks to such computers can be key to cost-effective operation of a data center. In particular, each computer should be operating at or near full capacity at all times so that the data center need not have unnecessary idling computers. Such idling computers are wasteful because they cost money to purchase and install, but do little or nothing to increase capacity, and they take almost as much electricity and generate almost as much heat as do fully loaded computers (assuming that numerous different computers are idling for short periods).

Distribution of tasks to computers is relatively simple when all of the computers and tasks can be considered homogenous, i.e., the computers have essentially the same capabilities and all are thus equally capable of handling any incoming task, and the tasks have essentially the same requirements and all can thus be handled equally well by any computer. In such a situation, an incoming task can be given to any waiting computer equally. However, the job of assigning tasks gets harder where the tasks are not identical and the machines have differing present loads of tasks assigned to them. Even worse, in large installations, computers tend to change over time, with newer computers providing greater capabilities, and new or upgraded computers having the latest operating systems and software applications. As a result, the machines in a cluster become heterogeneous over time. In such situations, intelligent provisioning of tasks to computers in a group or cluster becomes much more difficult.

SUMMARY

This document describes systems and techniques that may be used to assign incoming computing tasks to computers in a heterogeneous cluster of computers. In general, the cost of particular computers (e.g., alone or in groups) with respect to a task that is to be assigned for execution is determined, and the task is assigned to the machine with lowest cost for that task. One criteria for determining the cost of assigning a particular task to a particular computer is how desirable that computer is likely to be for future tasks that need to be assigned the more desirable that a computer is likely to be for future tasks, the higher the cost of assigning any particular task to that computer. By selecting the least desirable (for expected future tasks), yet fully capable computer, more desirable machines are left open for handling future tasks, which may require greater capabilities than does the current task, or more precious capabilities (e.g., capabilities shared by very few available machines) than does the current task.

The desirability of a machine, sometimes referred to here as the machine's "hotness," is a function of the number of tasks that the machine is capable of executing and of the number of other machines that can execute those tasks. If the number of tasks that are expected to be submitted to the system that a machine can execute is high and very few other machines can execute those, then the machine is hot and should be reserved, in effect, for tasks that are more specifically directed to it and not to other machines; if less demanding tasks come along, and it is all that is left, it can always be assigned to those too.

In one implementation, a computer-implemented method for assigning computing tasks to computers in a group is disclosed. The method comprises determining, for each computer in a group of computers, an ability of the computer to execute tasks expected to be received by the group of computers; generating an ability indicator for each computer based on the ability determination for the computer; and assigning an incoming computing task to one of the computers using the ability indicator. The computing task can be assigned to a computer having a lowest ability indicator within a sub-group of computers that are capable of handling the task. The method can also comprise applying a historical time window to tasks performed by the group, and generating the ability indicator for each computer using substantially only tasks performed during the time window.

In certain aspects, the method further comprises transmitting data needed to perform the task to the assigned computer. Moreover, assigning the incoming computing task to one of the computers can include determining a cost of assigning the task to a computer that is a weighted combination of the ability indicator, a preemption impact of executing the task with the computer, and one or more other cost factors associated with the task. The ability indicator can also be generated by comparing the ability of the computer to execute a task to an indicator of the ability of other available computers in the group to execute the task. In addition, the ability indicator can be generated by recursively determining a desirability of computers in the group of computers with respect to selectivity of the tasks, and selectivity of the tasks with respect to desirability of the computers.

In other aspects, assigning an incoming computing task to one of the computers using the ability indicator, can comprise assigning the task to a computer within a set of available computers that exhibits the least flexibility to execute future tasks that match a distribution corresponding to the tasks previously received. Also, the ability indicator can be further computed to reflect preferences of the tasks for certain computer features, wherein the desirability of a computer is heightened if it is capable of matching the preferences. The method can also comprise determining the tasks expected to be received by the group of computers by identifying a historical grouping of tasks received by a computer system.

In yet another aspect, the historical grouping of tasks comprises the tasks currently executing on the group of computers. In addition, the historical grouping of tasks can comprise tasks from a time period for a time of day corresponding to a time of day during which the tasks will be assigned.

In another implementation, a computer-implemented computer assignment system is disclosed. The system comprises a cluster of heterogeneous computers connected to perform assigned computing tasks, a database storing characteristics of a group of tasks expected to require execution on the cluster of computers, and a task scheduler to identify a computer from the cluster to be assigned an incoming task, by identifying a computer in the cluster whose assignment to execute a task will minimize a reduction in the cluster's capability to execute other tasks from the group of tasks. The group of tasks can correspond to tasks previously executed by the system, or may correspond to tasks previously executed by the system during a time of day corresponding to a time when the incoming task is to be assigned. The group of tasks can also include tasks previously executed at least in part by another group of computers.

In some aspects, the task scheduler is programmed to recursively compute an indicator of a reduction in utility of the cluster from assigning the incoming task to a candidate computer, and a specificity of the tasks to particular computers in the cluster. Also, the group of tasks can include tasks previously executed at least in part by another group of computers. Moreover, the task scheduler can be programmed to recursively determine an indicator of a reduction in utility of the cluster from assigning an incoming tasks to a candidate computer, using a database that stores characteristics of a group of tasks that have executed on a different cluster of computers.

In yet another implementation, a computer-implemented computer assignment system is disclosed, and includes a memory storing capabilities of a plurality of computers in a cluster, means for identifying desirability indicators for the computers in a cluster based on capabilities of the computers and requirements of tasks performed by the computers in the cluster, and a task router to assign an incoming task to the substantially least desirable computer that is capable of executing the task, as determined by the desirability indicators.

The details of one or more embodiments are set forth in the accompanying drawings and the description below. Other features and advantages will be apparent from the description and drawings, and from the claims.

DESCRIPTION OF DRAWINGS

FIG. 5 is a table that tracks data about computers in a group and tasks assigned to be executed by the computers.

Like reference symbols in the various drawings indicate like elements.

DETAILED DESCRIPTION

Figure 1:
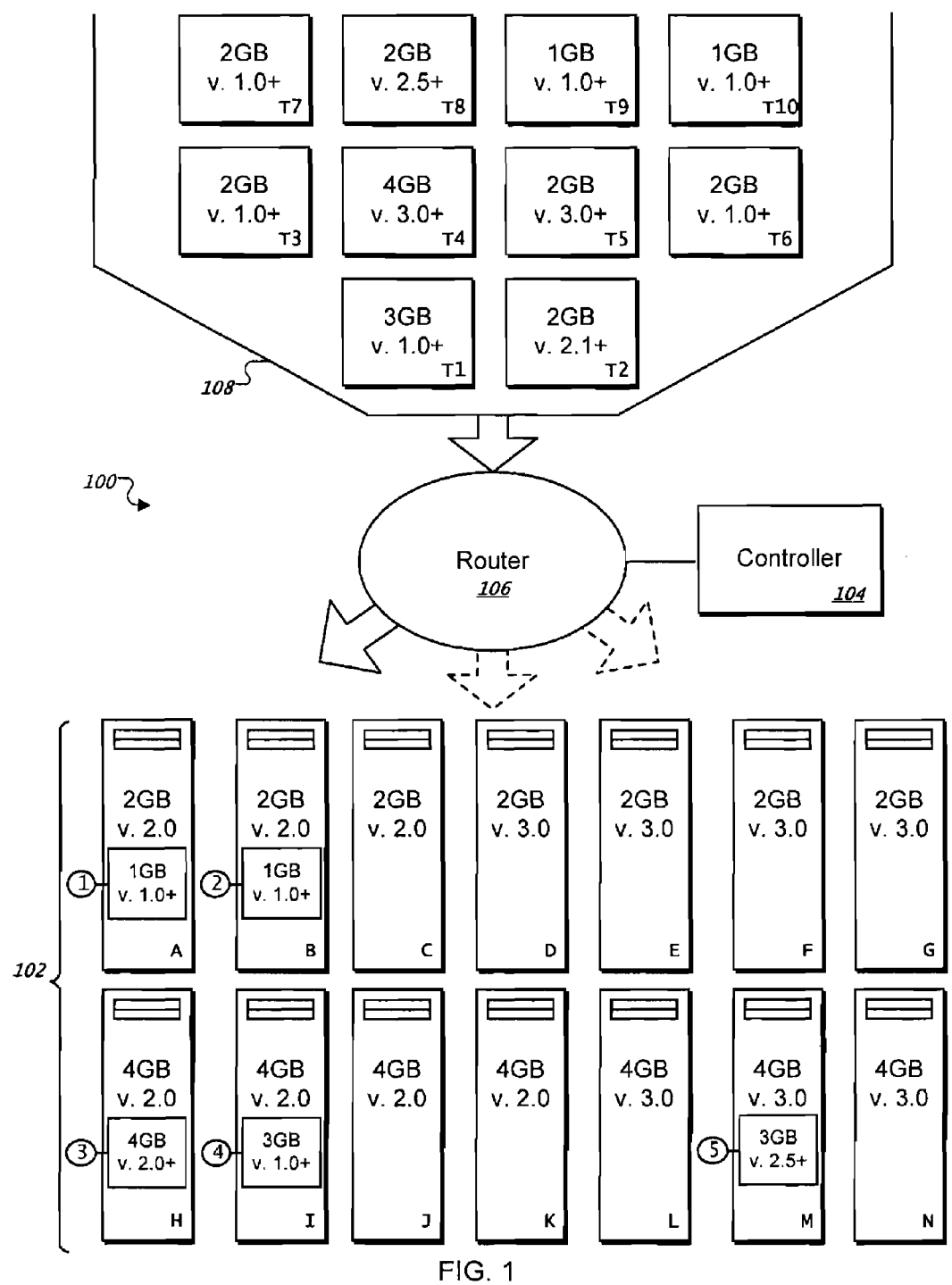
FIG. 1 is a conceptual diagram showing allocation of incoming computer tasks to computers in a heterogeneous cluster.

This document describes systems and techniques for assigning computing tasks to computing devices, such as large groups of devices, or clusters, in computer data centers. Proper assignment of tasks can be important so that the tasks are completed successfully and so that the computers in the system are as fully utilized as possible. With proper assignment of tasks, a data center can use fewer computers and less electricity, can perform more work with a set number of computers, and can handle spikes in demands for computing resources (e.g., when many users first wake up and check their e-mail, or on heavy shopping days for e-commerce systems).

In the techniques described here, the desirability or hotness of a computer (which may be a single computer or a group of computers, including one or more computers that are each capable of executing multiple tasks at once) is used to determine whether to assign an incoming task to the computer. Such desirability may, initially, be a function of the number or level of different tasks the computer can perform. A computer that can perform more tasks is more desirable because it has more flexibility within a system. Thus, it is best to "save" that computer and not use it now, so that it will be available for future tasks that might be more constrained in terms of the machines it can run on than is the current task.

For example, consider a cluster with two machines, identical except that Machine A can communicate within the cluster and with the Internet, while Machine B can only communicate within the cluster. A task arrives that requires a full machine, can run on either machine, but only needs to communicate within the cluster. Placing that task on Machine A reduces the flexibility of future assignments more than does placing it on Machine B, because placing it on Machine A precludes the system from scheduling a later-arriving task that needs to communicate with the Internet, whereas placing it on Machine B leaves open a machine for such a higher-demand task.

The desirability of a computer can also depend on how many other computers can perform the types of tasks that are expected to enter the system in the near future. For example, consider Machine A that can execute task 1 and task 2, and machine B that can execute task 2 and task 3. If nine other machines can execute task 1, but only one other machine can execute task 3, the opportunity cost of assigning an incoming task 2 to Machine B is greater than is the opportunity cost of assigning it to machine A. That is because an assignment to Machine B reduces the available machines for a later-arriving task 3 by 50% (and does not affect later-arriving task 1), but an assignment to Machine A reduces the available machines for a later-arriving task 1 by only 10% (and does not affect later-arriving task 3). Thus, the desirability, hotness, or importance of machine B is higher than that that of machine A, even though both are equally qualified to handle task 2. Particular techniques for determining the desirability of machines for assigning incoming tasks are described below, after a general presentation of the task-assignment problem is described here with respect to FIG. 1.

FIG. 1 is a conceptual diagram showing allocation of incoming computer tasks to computers in a heterogeneous cluster. In this example, tasks are shown in a hopper 108, to represent the queuing of such tasks as they are presented to a processing system 100. The tasks are labeled here for identification as T1 to T10. Although many tasks are shown waiting here, in reality the higher-number tasks, or requests to execute the higher-numbered tasks, may not have been received yet, and the requests may not even have been generated. Rather, the numbering of the tasks here, and the illustration of all the tasks already waiting in the hopper 108, are simply intended to represent a chronological order in which the tasks are to be received and processed by the system 100.

The tasks may take a variety of forms. For example, the tasks may include certain steps that are part of generating search results for a search request. The tasks could also include the playing of video files (e.g., for a service such as YOUTUBE), performing certain e-mail management functions, and various other software-related jobs, both large and small.

The system 100 in turn includes a group 102 of computers, labeled alphabetically for reference from A to N, that can perform a variety of tasks. The group 102 of computers may be referenced as a cluster, which is simply meant to indicate that the computers are related in some logical manner and are configured to have assignments scheduled on them by a common system.

Between the incoming tasks and the computers is a router 106 that directs certain incoming tasks to one or more computers in the group 102. The router is not intended to be an actual network router, but instead represents a component that includes functionality to have tasks sent to one computer or another in the group 102 of computers. The router 106 may work through networking devices such as switches and routers to have information routed properly. The router 106 is in turn controlled by a controller 104. The controller 104 includes various structures and logic to determine a best way of assigning incoming tasks to the computers in the group. Here, the router 106 and controller 104 are shown conceptually like a switching system in a rail yard, because they operate in similar manners, in that the incoming packets that are associated with tasks may be thought of as incoming cars that need to be assigned to appropriate tracks for proper handling.

In this system, both the tasks and the computers are heterogeneous, or differ from one task to another and one computer to another. The differences may exist in a variety of parameters for each task and each computer. For example, the parameters that are shown for illustration in the tasks and computers are memory (e.g., RAM) needed by a task to run and RAM memory available on a computer, and an operating system or program version needed by a task, where it is presumed that any more recent version will execute a task that needs a lower version (i.e., the versions are backwardly compatible).

Other parameters that can differ from machine to machine include other installed amounts of physical resources (RAM, disk, CPU cores, network uplink bandwidth, etc.), network configuration (e.g. NAT configuration, limitations on reachable nodes as defined by firewall rules, etc.), operating system and runtime library versions, and system infrastructure services that compete with user tasks e.g. fileserver, email server, etc.). At the same time, the machine configurations that are suitable to host a task will vary among tasks. For example, tasks might specify constraints that must be met (e.g. "cannot run on a machine with operating system version earlier than 2.1" or "can only run on machines that can communicate with external-to-the-cluster IP addresses") and preferences that should be met whenever possible (e.g., "try not to run on a machine that is also storing files for the distributed filesystem"). Task resource requirements (RAM, disk, CPU, network bandwidth) will also naturally exclude some machines from executing certain tasks; for example, a task that requires 4 GB of RAM will never be able to run on a machine that has only 2 GB of RAM installed.

The particular requirements for each task parameter are listed on each task in FIG. 1 for illustration here, and the resources offered by the computers for the same parameters are likewise listed on the computers near their centers. As shown in the figure, five tasks are already executing on the computers, shown by boxes on the front of each of the computers labeled by numbers and exhibiting an amount of memory and a minimum OS version. These tasks and others may have previously arrived, where the others have already executed and the corresponding machines are freed up to carry new tasks.

The next task to be assigned, T1, requires 3 GB of memory and at least version 1.0 of the OS. Such a task can be performed on any of the open computers having 4 GB of memory, so the goal is to assign it to a machine that will leave the most flexibility for assigning future tasks. Because one can assume, with the two parameters shown here, that bigger (more memory) or newer (higher version number) is always better, the decision is easy and the task should be assigned to machines J, K, or L. Although machine N is also capable of executing the task, assigning the task to machine N would be wasteful and would prevent servicing of a 4 GB, version 3.0+ task in the future, such as task T4 in the hopper 108.

Task T2, the next task to arrive, is a fairly unselective task, requiring only 2 GB of memory and version 2.1 of the OS. Any of the current machines other than machine C could handle it, so it can be assigned to machine D, which is one of four still-available machines having the same configuration in this example (assuming that all of the machines are still executing their tasks at this point).

Task T3 is a very basic task, requiring only 2 GB of memory and version 1.0 or higher of the OS. As such, task T3 can be executed on any of the computers in the system 100. If the task is to be assigned to the least-capable computer so as to keep future options open to the extent possible, the task will be assigned to computer C because every other computer can execute any task that computer C can. If, however, the parameters for the tasks and computers were not so open-ended (i.e., so that any more-capable computer could execute any task of a less-capable computer), then the assignment of task T3 may be made to computer E, because that computer is one of three available similarly-provisioned computers, whereas computer C is the only computer having its provisioning.

Figure 2:
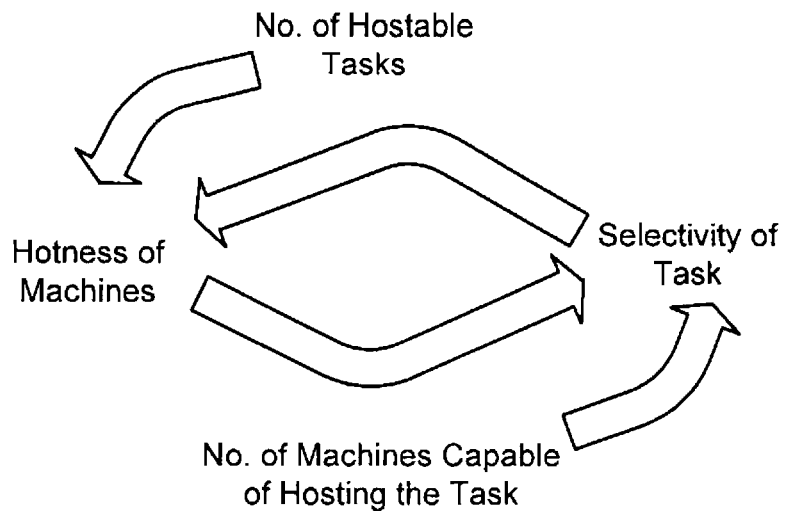
FIG. 2 is a flow diagram showing interaction between determined hotness for a machine in a system and determined selectivity of tasks running in the system.

A model for handling more complicated assignments, such as when tasks cannot simply be assigned to more capable computers up the line, is shown in FIG. 2, which is a flow diagram showing interaction between determined hotness for a machine in a system and determined selectivity of tasks running in the system. Here, hotness is a measure of the ability of a machine to execute a standard set of tasks, where the ability to execute more of the tasks in the set means that a computer is hotter. Selectivity is the ability of a particular task to be executed on a computer from a given set of computers, where higher selectivity means that the task can be executed on fewer computers in the set.

The given set of computers may, in particular cases, be all computers in a cluster, or the computers in a cluster that are currently available or soon to be available (e.g., the computers that are available plus computers that will finish their currently assigned tasks soon). In this parlance, a computer can also be available where a particular processor on a multiprocessor board or multi-process core is available.

The given set of tasks may take a variety of forms, and is generally selected from a group that is expected to approximate the types of tasks that will be received in the future. As such, the provisioning of tasks to computers in the present can be expected to best reserve necessary computers for future expected needs. In one implementation, for example, the group of tasks may simply be the tasks that are currently being executed on the system. In other implementations, other historical groups of tasks may be used, such as tasks received in the past x minutes or hours, or tasks received the previous day at the same time. In particular, a system administrator or a machine learning system may recognize that a certain types of tasks having a certain distribution of requirements or preferences appear at the same time every weekday, and may use such a distribution (e.g., from a particular day or as an average over multiple days and weeks) as a hypothetical group from which to base an expectation of future received tasks. As one example, e-mail related tasks may spike each day in the morning, so that the system may be programmed to anticipate such tasks before that time, and may thus be biased toward holding in reserve computers that can perform such functionality.

The assignment of tasks may be made based on the hotness of a particular machine, in that hotter machines will not have tasks assigned to them (so that they can be left open to execute the widest variety of expected future incoming tasks) or will be less likely to have tasks assigned to them (e.g., where hotness is one of multiple factors considered in assigning a task to a particular computer). As shown in FIG. 2, this overall determination of hotness is dependent on the number of tasks that the particular computer can host or execute, and on the selectivity of those tasks. The selectivity of a particular task in turn depends on the number of computers on which the task can be executed or hosted and on the hotness of those machines. In other words, a machine will be hotter if its equally-capable colleagues are also hot. Such a model is thus more complex than those just discussed, and involves a mutually recursive relationship between hotness of computers and selectivity of tasks.

For example, consider machine A that satisfies the constraints of task 1 and machine B that satisfies the constraints of task 2. Assume that task 1's constraints are also met by machine C, and task 2's constraints are also met by machine D. If machine C is "hotter" than machine D, then task 1 should contribute more hotness to the machines that can host it (task 1) than task 2 should contribute to the hotness of the machines that can host it (task 2). In this way, machine A will be hotter than machine B. The intuition behind this component of machine hotness is that because machine C is hotter than machine D, machine C is more likely to be needed in the future by an arbitrary arriving task, so task 1 can be considered to be more selective about the machines it can run on compared to task 2, even though both can run on the same number of machines. In essence the hotness of the machines a task can run on is a second dimension of the selectivity of the task (the first dimension being the absolute number of machines a task can run on).

Particular examples of such an approach to determining machine assignments in a computer cluster are described in detail below.

Figure 3A:
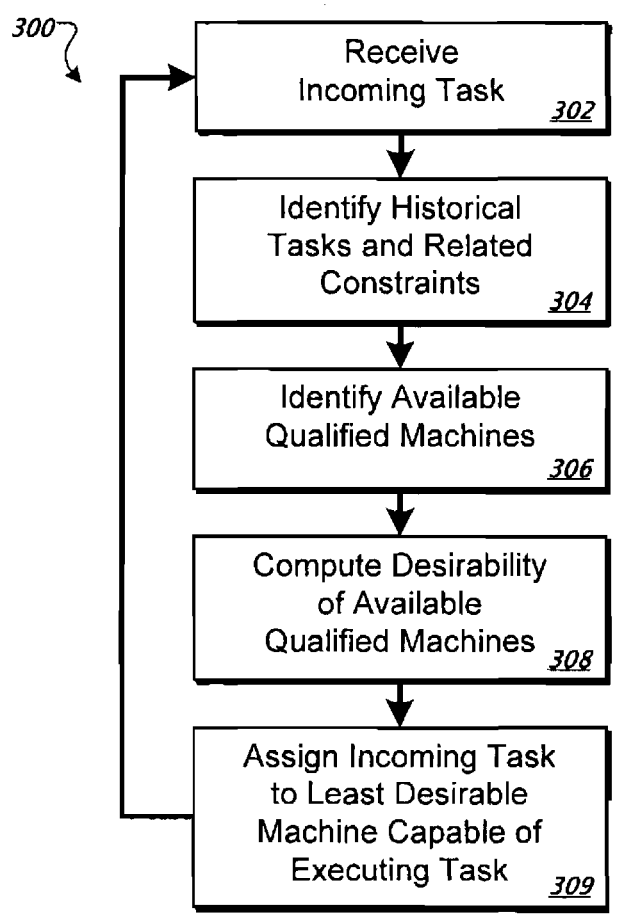
FIG. 3A is a flow chart of a process for assigning tasks to machines in a cluster.

FIG. 3A is a flow chart of a process 300 for assigning tasks to machines in a cluster. In general, the process 300 involves determining parameters for a group of tasks that is expected to reflect future tasks received by a system, and identifying particular machines to execute the actual tasks as they flow in.

At box 302, an incoming task is received. Upon receiving a task, the process 300 may begin to identify a place for the task such as by identifying historical tasks and related constraints, or parameters, for those tasks. In particular, a number of tasks that were processed during a certain prior time period may be identified, such as those received during the previous hour or those currently being executed by the system. The parameters for those tasks, such as an application needed to execute the task, a level of memory needed for the task, an access level required from a third-party data provider, and the like, may be identified.

Such historical tasks may have previously been determined and catalogued. For example, the process 300 may continually keep track of the tasks currently being executed by a system and may also keep track of the parameters that are required by, or desired by, those tasks. Alternatively, a group of tasks may be identified periodically rather than continuously, and that particular group, and its parameters, may be used as the historical tasks until they are next periodically updated.

At box 306, available and qualified machines for executing the task are identified. A machine is available if it has capacity left to execute another task, and is unavailable if it cannot work on the task in the time that the task must be served. The machine is capable if it has parameters of its own that are sufficient to execute the task.

At box 308, the process 300 computes the desirability of the available and qualified machines. In particular, as discussed above and in more detail below, each machine in a cluster may have a desirability indicator that is a function of its own capabilities and of the demands placed on a system by the particular tasks that are expected to be received by the system.

In certain implementations, the machine desirability may be computed according to groups of computers, which may themselves be viewed as multi-process computers in aggregate. For example, in a very large data center, a rack of computers may be tracked as a single entity and may be considered available as long as some of the machines in the rack have available capacity. In such a situation, each of the machines in the rack may be similarly provisioned, i.e., have the same parameters, or a lowest-common-denominator may be assumed to be the attributes for each of the machines in the rack. By treating all of the machines in the rack as one, such a system may reduce the computing load required to assign tasks in a very large data center where thousands of computers are operating.

At box 309, with the appropriate factors computed, the task is assigned to be executed by a particular computer that is determined to be least desirable, so that making the machine unavailable does the least damage to the flexibility that remains in the system. Such assignment may occur, for example, by directing a server that manages and routes incoming tasks to transfer data associated with the task to an assigned computer.

The routing may occur by the server receiving a user's specification of the requirements for the task. The system may interpret the specification and use it as input to a scheduling algorithm. Data associated with the task may then be transferred to a computer that is assigned by the scheduling algorithm and the task may be started on that computer.

The desirability of the computers may be a single factor or signal in determining where to assign a task for execution, or other factors may also play a role. For example, the geographic location of a server may be considered, as may its current temperature (i.e., tasks may be shunted away from a computer that is starting to run hot), among other factors. Thus, the machine desirability as computed here may serve as an assignment signal, but not the only such signal.

In addition, where multiple computers are equally desirable, such as a group of computers having identical capabilities or parameters, other factors may affect which computer, of those multiple computers, is assigned to execute the task. For example, a FIFO approach may be taken, whereby the most recent computer in the group to complete a task may be assigned the next incoming task—with such an approach, certain machines will be kept more fully loaded than will other machines. Alternatively, a LIFO approach may be used so that the computer that has been idle the longest in the group gets the task—with such an approach, the load on the various machines will be evened out. Alternatively or in addition, weight can be assigned to machines based on the present load of their different resources and the load requirements of the task that needs to be assigned, and the task can be scheduled according to these needs.

Figure 3B:
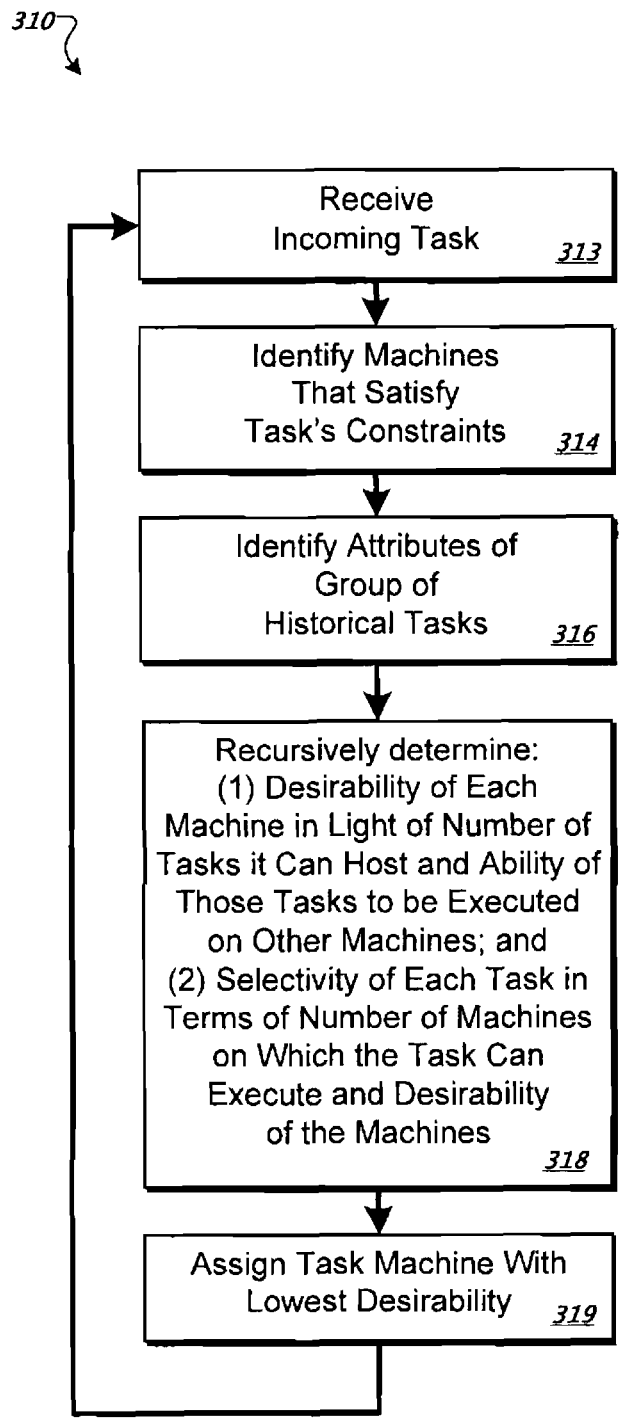
FIGS. 3B and 3C are flow charts of processes for computing factors for machines in a cluster so as to determine which machine should be assigned a task.
Figure 3C:
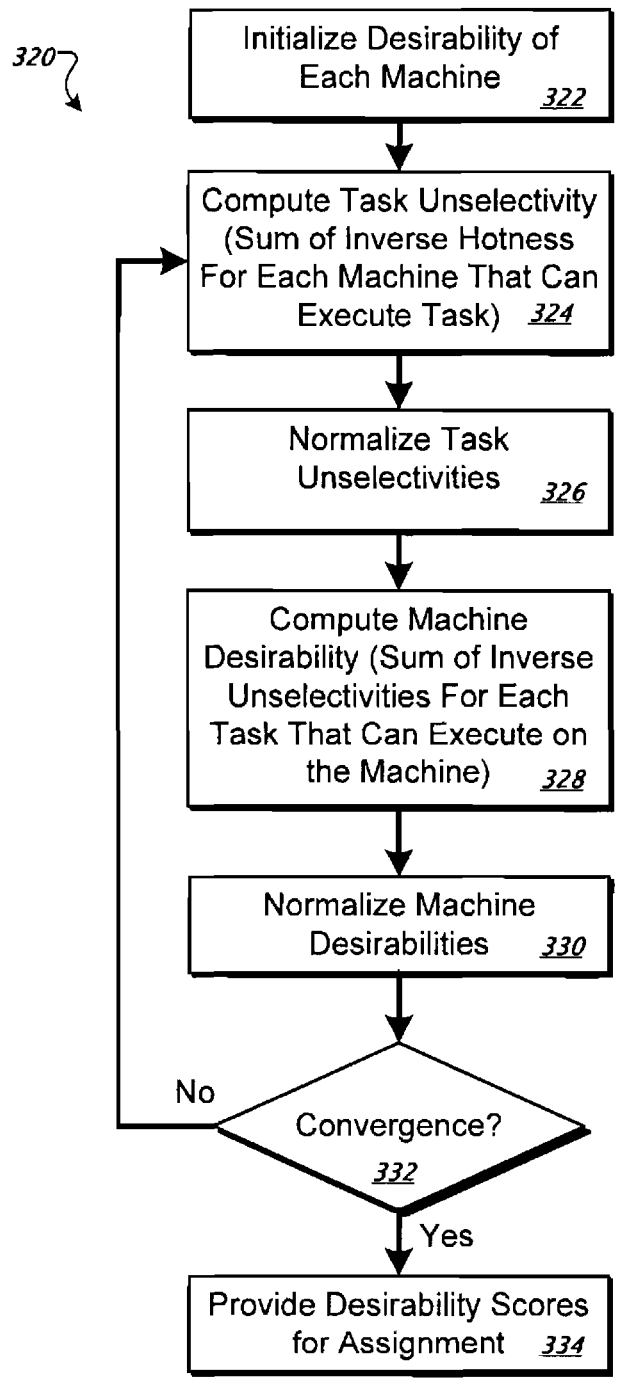

FIGS. 3B and 3C are flow charts of processes for computing factors for machines in a cluster so as to determine which machine should be assigned a task. The process 310 of FIG. 3B generally shows the assignment after recursively determining desirability of machines in a cluster and selectivity of tasks assigned to a cluster (e.g the sorts of tasks predicted to be received in the future). FIG. 3C is a similar, though more detailed, process 320 of determining desirability scores for computers so as to permit the assignment of computing tasks to the computers.

Referring now to FIG. 3B, the process 310 involves receiving an incoming task that requires a certain level of computing capabilities, and may also have preferences (though not requirements) for other capabilities. Machines within a cluster that can satisfy the constraints for a task, and are thus capable of executing the task are then determined, as are such computers that are currently available to execute the task, at box 314. Such determinations may be made by referencing a table that lists machines and their capabilities, such as is shown in FIG. 5 below.

At box 316, attributes of certain historical tasks are determined. Such a determination may be made, for example, by consulting a table or list of attributes for all of the tasks received or handled by a system during a particular past time period, by making an estimate of future tasks using past tasks from a similar period or periods, or by other appropriate mechanisms.

Box 318 shows a particular technique for determining the desirability of various machines from the group of machines that is available and capable of executing the task. The technique here involves a recursive determination, whereby desirability of machines in the group is determined, and then selectivity of tasks is determined, and the determinations are repeated. The machine desirability depends on the tasks' ability to be executed on each machine and also on the capabilities of the machine itself to execute particular tasks. In a similar manner, the selectivities of the tasks may depend on the number of machines in the group that have the capability to execute the tasks, and also on the desirability of those machines.

Such a recursive determination may be repeated until a determined condition is met. In particular, if the values for the various parameters are properly selected, the values for desirability and selectivity will converge to certain values, and the recursive determination may end when such convergence occurs. For example, the calculation may end when the difference of a certain desirability or selectivity value changes from one cycle to the next by less than a certain percentage value such as ten, five, or one percent. Also, the end may be determined upon the change in an average value of a group falling below a certain level. Also, a determined number of cycles of the recursive process may be made, where experience indicates that such a number of cycles will generally be sufficient. Other mechanisms for terminating the recursive process may also be used.

At box 319, the task is assigned to the machine that is determined, by the recursive process of box 318, to be the least desirable for the task and the group of tasks expected in the future. Other factors may also be considered when assigning the task, as discussed above and below, so that the task is assigned to a computer that is not the least desirable but is among the least desirable.

Referring now to FIG. 3C, the illustrated process generally involves a process like that shown in FIG. 3B, but with additional detail. The process may be expressed by pseudo-code of the form of:

Initialize HOT(m)=1
repeat:
  repeat for all tasks (UNSELECTIVITY(task)=sum over all machines m on which task can run (1/HOT(m)))
  normalize UNSELECTIVITY
  repeat for all machines (HOT(m)=sum over all tasks that can run on m (1/UNSELECTIVITY(task)))
  normalize HOT
until convergence In this example, HOT is a variable assigned to each of m machines that describes the desirability of the machine for executing tasks in an expected group of tasks. The variable UNSELECTIVITY is a variable assigned to each of multiple tasks in a group of tasks that is expected to be received by a system, and measures the ability of a particular task to be handled by the various machines in a group of machines. Hotness is higher as the number of tasks that can be executed on the machine increases, and in particular, as the number of highly selective tasks increases. Hotness is computed over all machines in a cluster. Unselectivity is higher as the number of machines on which the task can be executed increases, and is lower as the hotness of those machines increases. Thus, in this sense, unselectivity is effectively the inverse of the selectivity discussed above.

Referring now to FIG. 3C, which shows the process exhibited by the pseudo-code, the hotness or desirability of each machine is first initialized (box 322). In this example, the values for hotness and unselectivity are to lie between 0 and 1, so hotness is initially set to 1.0 for each machine. Other initialization numbers may be selected, though such a selection should be chosen to provide reasonable speed for the process to converge on final values.

The process 320 then begins a recursive looping of calculating hotness and unselectivity values. At box 324, a first sub-loop is entered, by which unselectivity is computed for every task in a set (where the set may be obtained in various manners, and generally represents an arrangement of tasks that is expected to be received by the system). The unselectivity for each task is simply the sum of the inverse hotnesses for the machines that can execute the task. In the first round, because the machine hotnesses are all set to one, the unselectivity is the total number of machines that can execute the task, i.e., the actual hotnesses of the machines does not yet play a role.

For example, if the universe of tasks includes only two tasks, the first task can run on two computers and the second can run on four computers, the unselectivity of the first task will be 1/1+1/1, or 2, and the unselectivity for the second task will be 1+1+1+1, or 4. In other words, the task that can run on twice as many machines is twice as unselective (or half as selective) compare to the other machine. Note that, if the hotness of a machine is lower, then the denominator of its factor in the unselectivity computation will be lower, and its contribution to unselectivity will be higher (i.e., small denominators make for big numbers). So, if it turns out in later rounds that the machines for a task are not hot in aggregate, the task will have higher unselectivity (or lower selectivity) than if the machines for that task were hotter.

At box 326, the unselectivity of each task is normalized relative to the total unselectivity across all tasks, i.e., so that each falls between 0 and 1 and the sum of all normalized unselectivities across all tasks equals 1. Thus in the two-task example above, the unselectivity of the first task would be normalized to 2/6 (or 1/3) and that of the second task to 4/6 (or 2/3). Other adjustments to the scores may also be made, as is appropriate for the factors used in a particular system or process.

At box 328, the process 320 then enters another sub-loop for computing hotnesses of machines in the system. The computation here is again a summation across all relevant entities, of the inverse of the relevant factor. More particularly, the computed hotness for a machine is the sum of the inverse unselectivities of all tasks in the group that can be executed on the machine. And again, at box 330, the resulting scores can be normalized, this time relative to the total hotness across all machines, or otherwise adjusted.

At box 322, the process 320 tests to determine whether the looping can stop. In this example, the looping stops when the machine whose hotness has changed the most (as a percentage of its value in the previous iteration) in the most recent iteration, has changed relative to its value in the previous iteration by less than a determined threshold percentage of hotness. As noted above, other terminating determinants may also be employed for stopping the calculations.

At box 334, concrete and tangible use is made of the computed scores. In particular, the hotnesses of the various machines may be used as the signal, or a signal, to determine the machine in a group that should be assigned a particular task. For example, the machine with the lowest hotness score may be assigned the task, because that machine, in general, does not have highly valued capabilities, particularly when those capabilities are measured against the currently available group of machines and against the capabilities that are expected to be required for executing future incoming tasks.

As discussed above, the hotness indicator or score may also be used with a variety of other indicators to assign an incoming task for execution, or may be used in a variety of other applications apart from task assignment determinations. In scheduling tasks to machines, the factors used to determine to which machine to assign an incoming task may be measured as "costs" of assigning the task, with the lowest-cost machine for a particular task ultimately selected as the machine that will run that task.

One such cost besides machine hotness is that of preemption. In particular, when all available machines are busy and a new task arrives to be scheduled that is considered "more important" than one or more of the currently-executing tasks, the system may decide to terminate one or more of the currently-executing tasks in order to free up the resources needed to execute the newly-arrived, higher-priority task. For example, tasks relating to crawling web pages for a search engine typically have no real urgency and thus can be considered low-priority, while tasks related to providing a customer with a real-time response may be considered high-priority. The cost of this preemption may take into account the time that it takes to wrap up a task and ship it to another machine in a cluster (which may be the least hot machine on which the task can run), the priority of the task that is preempted, or other factors.

The total cost of assigning a task to a particular machine may simply be a weighted form of the various constituent parts of total costs, expressed for the cost of a particular task "task" on machine "m," as:

Cost (task, m)=$\alpha$*other_cost_factors(task, m)+$\gamma$*preemption_cost(task, m)*number of times task has been preempted+$\delta$*hot(m)

In this computation, $\alpha$, $\gamma$, and $\delta$ are weighting factors chosen with a goal of ensuring that trivial hotness differences are overshadowed by important preemption goals, and vice-versa, and generally balancing the goals of preemption minimization, hotness, and other scheduling factors. The preemption_cost(task, m) measures the severity of the preemptions that will be triggered if "task" is scheduled onto machine "m." This severity measure may take into account factors such as the number of tasks that would be preempted on "m", the priorities of the tasks that would be preempted, the amount of data that the preempted tasks would need to load onto the new machine onto which they are rescheduled, and other relevant factors. The other cost factors may take a variety of forms, and the hot factor is an indicator, for a particular machine, that reflects how important the machine is relative to future expected incoming tasks.

The assignment of tasks may also take into account preferences of tasks in addition to requirements of tasks. For example, a task may run more efficiently on a machine that runs a particular application or operating system even if it will run on lesser machines, so a list of parameters associated with the task may show a preference for such a machine. In such a situation, the (1/unselectivity) that the task contributes to a machine's hotness may be scaled by a factor proportional to the preference of the task for such a configured machine (normalized). The assumption in such a situation is that, before hotness and other cost criteria are considered, a system will place a task on a machine that meets the most preferences for the task, so a to maximize the performance of the task. The other assignment or scheduling criteria may then be taken into account if there is a tie between multiple machines in terms of preference for the task. In such a situation, a task can be made to contribute less hotness to a machine if the machine satisfies fewer preferences, under an assumption that the task will, if it arrives in the future, be placed on that machine less often than it would be placed on machines that satisfy more preferences. As a result, the contribution of the task to the machine's hotness should be less if it will be placed on the machine less often.

In mathematical terms, the hotness of the machine may be expressed as:

HOT(m)=sum (beta(task, m))/UNSELECTIVITY(task))

where the sum is taken over all tasks that can be run on machine m, and beta(task, m), the normalized number of preferences of "task" that are met by machine "m", is computed as:

beta(task, m)=pref(task, m)/max(pref(task, m)

where pref(task, m) is computed as described below and "max" is taken over all machines that are capable of running "task" and pref(task, m)=(1+weight_of_satisfied_preferences(task, m))/(1+max_possible weight_of_satisfied_preferences (task)), where weight_of_satisfied_preferences(task, m)=# of preferences specified by "task" that are satisfied by machine "m", or 0 if the task does not specify any preferences and max_possible weight_of_satisfied_preferences=# of preferences specified by "task" (that is, the maximum number of the task's preferences that could possibly be satisfied), or 0 if the task does not specify any preferences In other words, the preference of a particular task for a particular machine is a normalized version of the number of parameters in common between a machine and a task and the total number of preferences for the task. And the beta for a task with respect to a machine is the preference of the task for that machine, as compared to the maximum preference value for that task across all machines. The hotness of the machine is then, in turn, biased higher if the preference of the various tasks that can run on it are high for the machine, and thus the beta is in turn high.

The processes just described are generally continuous processes, in that tasks are constantly arriving at a system and needing to be assigned to an appropriate computer. Also, the "arriving" tasks may include tasks that are new to the system, and also tasks that are rescheduled, such as because the machine on which they were running failed, or they were preempted by a higher-priority task. As a result, the processes may need to accommodate incremental computations of various values. For example, while a process is running, new machines may be added to the system or new tasks may be added to a profile of tasks that are likely to be received by the system. Such new tasks and new machines may be added to the list of tasks and machines addressed by the computations listed above (and other tasks and machines may be removed from the lists). Also, the new tasks and machines may be initialized with hotness and selectivity values that provide for proper and more seamless integration of the new factors. In one example, the initial hotness values may be the average hotness value across all machines currently in the system, and the initial unselectivity values may be the average unselectivity value across all tasks currently in the system.

In addition, if the system fails, re-start of the system, with computations of thousands of tasks and machines recursively from base values, may be relatively time consuming. As a result, the values of hotness and selectivity for machines and tasks in a system may be stored periodically, and the most recent values may be used to initialize a system when it re-starts. Other appropriate mechanisms may also be used to address new machines and tasks, and re-starts also.

In sum, various factors may be used to determine a desirability of a machine with respect to tasks that are anticipated to arrive at a group of computers in the near future. In the general example described here, the capabilities of the machine in general, and the capabilities of the machine in relation to those of other machines and to demands of expected tasks, may be used to determine the cost of assigning a particular task to that machine. This cost may have additional components, such as preemption cost and other cost factors.

Figure 4:
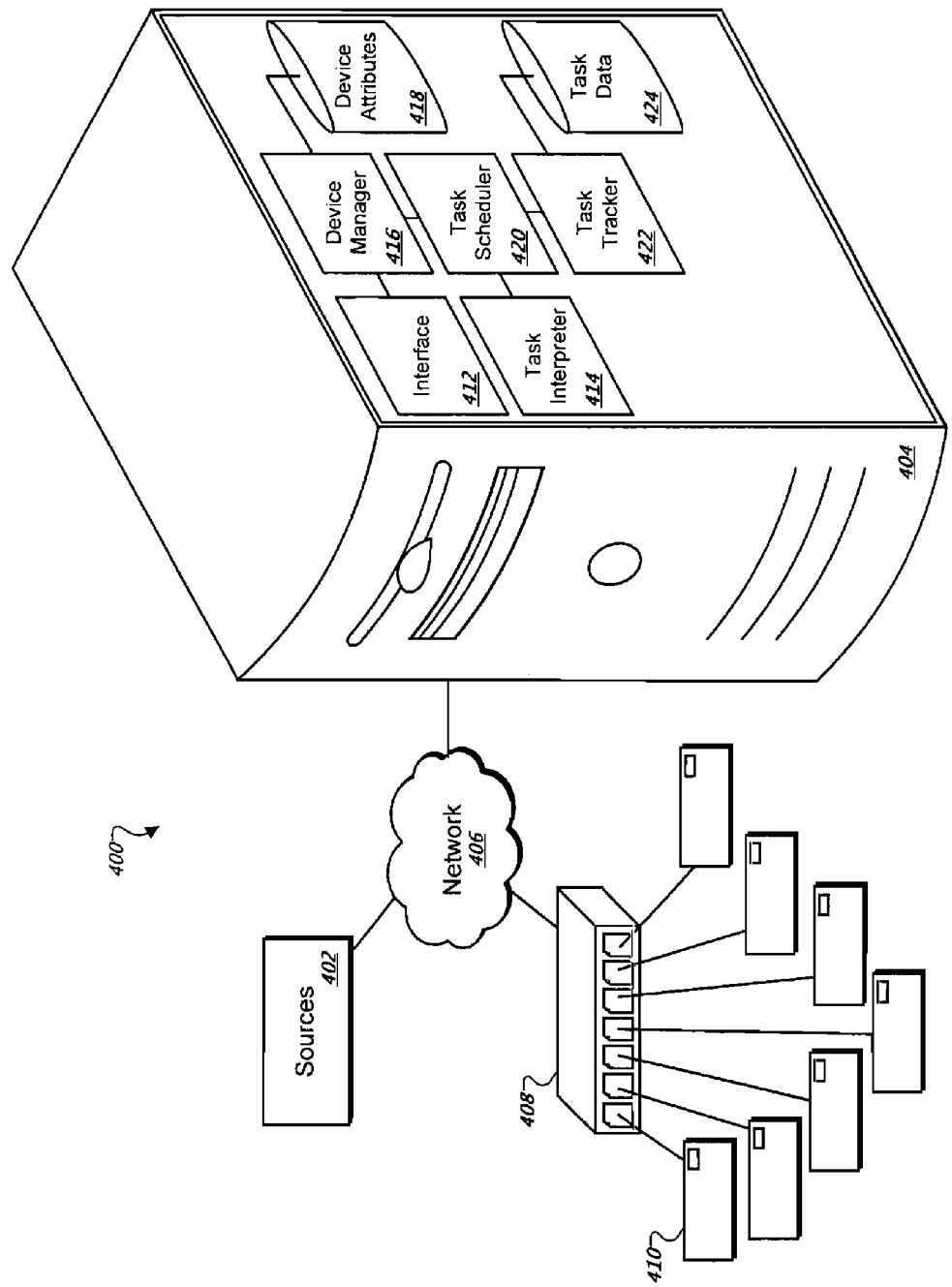
FIG. 4 is a block diagram of a system for assigning tasks to computers in a group.

FIG. 4 is a block diagram of a system 400 for assigning tasks to computers in a group. In general, the system 400 includes structural components for matching tasks to computers that are available and capable of executing the tasks. The components more particularly attempt to assign tasks to computers in a way that maximizes system flexibility with respect to the ability to find suitable machines to execute subsequently arriving tasks.

The system 400 includes an assignment server 404 whose role is to track the operation of a group of computers 410 and to direct the assignment of incoming computing tasks to the computers 410. In particular, the computers 410 may be part of a data center that includes hundreds or thousands of computers and that also receives a variety of computing requests, such as search requests, internal code testing requests, crawling requests, e-mail requests, requests to stream video programs, and other such requests. The requests may come from various sources 402, such as from web servers and other servers within a larger computer network operated by an organization such as GOOGLE.

Networking equipment such as switch 408 may connect the computers 410 with each other, and network 406 may in turn connect the computers 410 to other computers such as server 404 and the sources 402. The network 4067 may include, for example, parts of a LAN or WAN, and may also include the internet and other private or public networks. The particular form of the network is not critical here, and various topologies, arrangements, and implementation may be effective depending upon the particular factors facing a designer of a system.

The server 404 includes an interface 412 for receiving information regarding tasks that need assignment and for directed that such assignment occur. The interface 412 may, for example, parse apart requests to assign tasks into their constituent parts, and may route the relevant data to other components in server 404. For instance, the substance of a particular task may be provided to task interpreter 414, which may determine parameters associated with the task, such as the amount of memory needed to execute the task, and other parameters.

The parameters for the task may then be provided to a task scheduler 420. This component may apply the processes discussed above to determine where in a system of computers 410 incoming tasks should be assigned. The task scheduler 420 may rely on a task tracker 422 to keep an updated version of tasks being executed in a system and tasks likely to be received in the future. Specifically, the task tracker may receive and log task assignments by the task scheduler 420 and reports from tasks of applications when the tasks are completed. As such, the task tracker 422 can maintain a constantly up-to-date list of the tasks being handled by the system 400. Also, the task tracker 422 may rely on task data 424 to store state information, and also information about parameters of tasks handled by the system currently or in the past. The task tracker may use such data to construct a profile of likely tasks to be received in the future, to provide to the task scheduler 420 when it is determining assignment information. The task tracker 422 may, for example, periodically update a task profile (e.g., a list of expected tasks and a distribution of those tasks) and provide the updated profile to the task scheduler.

The task scheduler 420 may also obtain data from a device manager 416, which stores and reads data from a device attributes 418 database. The device manager 416 may provide information regarding the capabilities of each device (e.g., computer) in a cluster and may also track which devices are currently busy or available. The task scheduler 420 may use such information in a manner similar to its use of the information provided by the task tracker 422, in order to determine a device to which a particular task is to be assigned. For example, the device manager 416 may provide a list of currently-available computers along with the appropriate relevant parameters (e.g., OS version, available applications, RAM, etc.) for the computers.

In operation then, a request to assign a task from a source may be received by the interface 412 and routed to the task interpreter 414 when it is determined to be a task assignment request. The task interpreter may identify a plurality of requirements and/or preferences associated with the task (e.g., either from information contained in the task assignment request, or by referencing a separate data source, such as a look-up table, using information in the request) and pass them to the task scheduler 420. The task schedule 420 may in turn request the status of the various computers 410 from the device manager 416 to obtain a list of available computers, and may then narrow that list of computers to a subset of computers that are capable of executing the task. The task scheduler 420 may then apply processes similar to those described above, using the list of available and capable computers and information about likely future tasks from task tracker 422, to identify a least desirable (least hot) computer.

The task scheduler, in combination with the interface 412, may then causes instructions to be transmitted so that a selected computer among the computers 410 receives data associated with the task, performs the task using that data, and returns information back to the appropriate component in the system 400.

FIG. 5 is a table that tracks data about computers in a group and tasks assigned to be executed by the computers. The table, in this example, has machine identifiers as a unique field, which correspond to the machines shown in FIG. 1. The table also includes fields for each type of parameter associated with the machines—here, the RAM and OS version, as shown on the machines in FIG. 1. The manner in which such information is represented may vary, and is shown in an easily readable format here for clarity.

The status of each server is also shown, with an x indicating that the server is currently busy with a task, and thus not available to be assigned a new task (though queues may be maintained for certain machines, so that tasks may be assigned even to busy machines). In addition, though not shown here, hotness indicators for each machine, such as a normalized hotness score, may be shown. The tasks, from among five tasks currently relevant to the system, are also shown with respect to whether a particular computer can execute the particular task.

This table thus shows various variables that may be tracked by a task assignment system. The particular variables, and the arrangement of those variable—whether in one or multiple entities (e.g., tables)—will, of course, vary depending upon the particular implementation.

Figure 6:
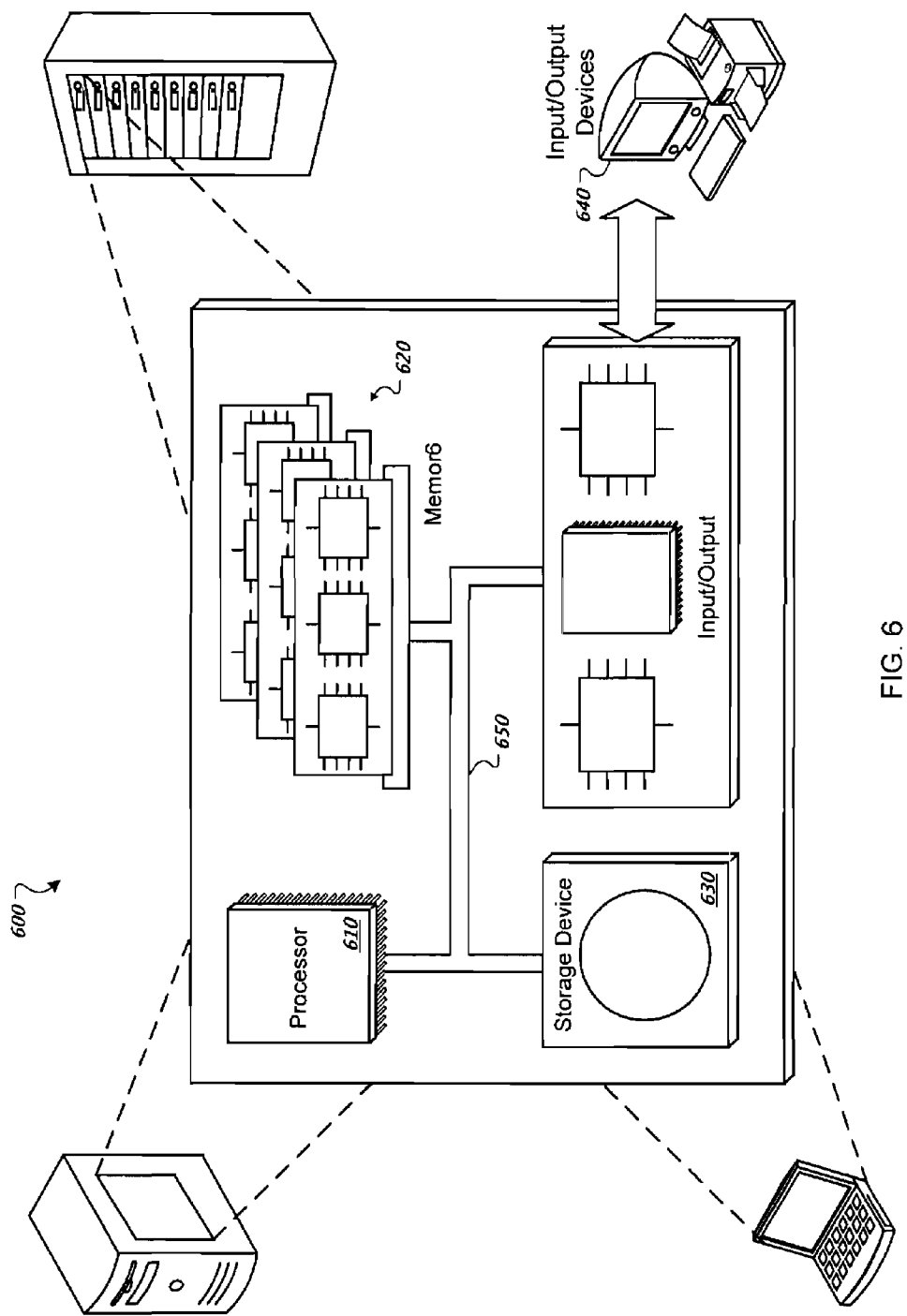
FIG. 6 shows an example of a computer device and a mobile computer device that can be used to implement the techniques described here.

FIG. 6 is a schematic of an exemplary general computer system 600. The system 600 can be used for the operations described in association with any of the computer-implemented methods described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Moreover, although the focus of the particular descriptions here have been on particular tasks performed on particular computers, groups of tasks in the form of "jobs" may be processed using the features discussed above. Accordingly, other implementations are within the scope of the following claims.

What is claimed is:

1. A computer-implemented method for assigning computing tasks to particular computers in a group of computers, the method comprising:
    determining, for each computer, an ability of the computer to execute a number of differing tasks;
    identifying, for each computer, a quantity of similarly-provisioned computers;
    generating, for each computer, an indicator for the computer based on the determined ability of the computer, and based on the identified quantity of similarly-provisioned computers; and
    assigning a particular task of the differing tasks to one or more computers based on the indicator of each computer, wherein the determined ability of the one or more computers is greater than a determined ability of a computer that has a lowest ability from among the remaining computers.

2. The method of claim 1, wherein assigning the particular task further comprises assigning the particular task to the one or more computers having a lowest indicator that are capable of executing the task.

3. The method of claim 2, further comprising applying a historical time window to tasks executed by the group of computers, and wherein generating the indicator further comprises generating the indicator for each computer using substantially only tasks performed during the time window.

4. The method of claim 1, further comprising transmitting data needed to execute the particular task to the assigned one or more computers.

5. The method of claim 1, wherein assigning the task to the one or more computers of the group of computers includes determining a cost of assigning the particular task to each computer, wherein the cost is a weighted combination of the indicator of the computer, a preemption impact of executing the particular task with the computer, and one or more other cost factors associated with the assignment of the particular task to the computer.

6. The method of claim 5, wherein the particular task is assigned to the one or more computers with the lowest cost among a sub-group of computers capable of executing the task.

7. The method of claim 1, wherein generating the indicator further comprises comparing the ability of the computer to execute the particular task to the indicator of other the remaining computers in the group of computers.

8. The method of claim 1, wherein assigning the particular task to one or more computers further comprises assigning the particular task to one or more computers within the group of computers that exhibits a least flexibility to execute future tasks that match a distribution corresponding to the tasks that are previously received.

9. The method of claim 1, wherein generating the indicator further comprises generating the indicator to reflect preferences of the differing tasks for certain computer features, and wherein a desirability of a computer is increased if the differing tasks that are capable of executing on that computer express a large number of preferences that are met by that computer.

10. The method of claim 1, further comprising identifying the tasks by identifying a historical grouping of tasks previously received by the group of computers.

11. The method of claim 10, wherein the historical grouping of tasks comprises the tasks currently executing on the group of computers.

12. The method of claim 10, wherein the historical grouping of tasks comprises tasks from a time period for a time of day corresponding to a time of day during which the tasks will be assigned.

13. A computer-implemented computer assignment system, comprising:
    a cluster of heterogeneous computers connected to execute a group of tasks received by the cluster of heterogeneous computers;
    a database storing values, for each computer, relating to an ability of the computer to execute a number of differing tasks, and storing values, for each computer, relating to a quantity of similarly-provisioned computers; and
    a task scheduler to identify one or more computers from the cluster to be assigned a particular task of the group of tasks by identifying the one or more computers in the cluster whose assignment to execute the particular task will minimize a reduction in the cluster's capability to execute other tasks from the group of tasks based on, for each computer, the ability of the computer, and based on the quantity of similarly-provisioned computers, wherein the ability of the one or more computers is greater than an ability of a computer that has a lowest ability from among the remaining computers.

14. The system of claim 13, wherein the group of tasks corresponds to tasks previously executed by the cluster.

15. The system of claim 13, wherein the group of tasks corresponds to tasks previously executed by the cluster during a time of day corresponding to a time when the task is to be assigned.

16. The system of claim 13, wherein the group of tasks includes tasks previously executed at least in part by another group of computers.

17. A computer-implemented computer assignment system, comprising:
    a memory storing values, for each computer of a cluster of computers, relating to an ability of the computer to execute a number of differing tasks, and storing values, for each computer, relating to a quantity of similarly-provisioned computers;
    means for identifying, for each computer, an indicator based on the stored ability value of the computer, and based on the quantity of similarly-provisioned computers; and
    a task router to assign a particular task of the differing tasks to one or more computers based on the indicators of each computer, wherein the stored ability value of the one or more computers is greater than a stored ability value of a computer that has a lowest ability value from among the remaining computers.

* * * * *

UNITED STATES PATENT AND TRADEMARK OFFICE
CERTIFICATE OF CORRECTION

| | | |
|---|---|---|
| PATENT NO. | : 8,843,929 B1 | Page 1 of 1 |
| APPLICATION NO. | : 12/173697 | |
| DATED | : September 23, 2014 | |
| INVENTOR(S) | : David L. Oppenheimer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1683 days.

Signed and Sealed this
Ninth Day of August, 2016

Michelle K. Lee
*Director of the United States Patent and Trademark Office*